US008817670B2

(12) United States Patent
Pandey et al.

(10) Patent No.: US 8,817,670 B2
(45) Date of Patent: Aug. 26, 2014

(54) FULL DUPLEX COMMUNICATION CIRCUIT AND METHOD THEREFOR

(75) Inventors: Sujan Pandey, Eindhoven (NL); Hubertus Gerardus Hendrikus Vermeulen, Eindhoven (NL); Abhijit Kumar Deb, Eindhoven (NL)

(73) Assignee: NXP B.V., Eindhoven (NL)

( * ) Notice: Subject to any disclaimer, the term of this patent is extended or adjusted under 35 U.S.C. 154(b) by 444 days.

(21) Appl. No.: 13/075,731

(22) Filed: Mar. 30, 2011

(65) Prior Publication Data

US 2012/0250587 A1    Oct. 4, 2012

(51) Int. Cl.
| | | |
|---|---|---|
| H04L 5/14 | (2006.01) | |
| H04B 1/56 | (2006.01) | |
| H03F 3/45 | (2006.01) | |
| H03F 3/68 | (2006.01) | |
| H04L 25/02 | (2006.01) | |

(52) U.S. Cl.
CPC ................... *H04L 25/0272* (2013.01)
USPC ........... 370/276; 375/257; 330/126; 330/133; 330/252

(58) Field of Classification Search
CPC ........... H03H 7/46; H03H 2/00; H03H 2/005; H03H 2/006
USPC ......................... 330/123–152, 250–252, 272; 370/276–277, 282–286
See application file for complete search history.

(56) References Cited

U.S. PATENT DOCUMENTS

| | | | |
|---|---|---|---|
| 5,465,072 A * | 11/1995 | Atarodi .......................... 330/254 |
| 6,259,745 B1 | 7/2001 | Chan | |
| 6,724,234 B1 * | 4/2004 | Iliasevitch et al. ............ 327/378 |
| 6,792,105 B1 | 9/2004 | Moyer | |
| 2002/0021236 A1 * | 2/2002 | Greig ............................ 341/136 |
| 2002/0135463 A1 * | 9/2002 | Reyes ...................... 340/310.01 |
| 2006/0210850 A1 * | 9/2006 | Abouatallah et al. ........... 429/22 |
| 2007/0080587 A1 * | 4/2007 | Ruizenaar et al. .............. 307/89 |
| 2007/0177679 A1 * | 8/2007 | Sovenyi ........................ 375/257 |
| 2007/0241813 A1 * | 10/2007 | Freeke ........................... 330/117 |
| 2008/0136384 A1 * | 6/2008 | Al-Shyoukh et al. ......... 323/273 |
| 2009/0206936 A1 * | 8/2009 | Fernandez et al. ................ 331/8 |
| 2010/0148857 A1 * | 6/2010 | Chellappa ..................... 327/538 |
| 2010/0158043 A1 * | 6/2010 | Bodo et al. ..................... 370/466 |
| 2010/0301899 A1 * | 12/2010 | Vigoda et al. ................... 326/52 |
| 2010/0306164 A1 * | 12/2010 | Reynolds et al. ............... 706/52 |
| 2011/0109389 A1 * | 5/2011 | Beffa ............................ 330/260 |

OTHER PUBLICATIONS

Telecommunications Industry Standards in People's Republic of China, "Technical Requirement of Physical Layer for Extended Reach Ethernet Based on 2D-PAM3 and 4D-PAM5" Released by PRC Industry and Information Department, Jun. 15, 2009.

* cited by examiner

*Primary Examiner* — Andrew Chriss
*Assistant Examiner* — John Lequang

(57) ABSTRACT

Duplex communications are facilitated. In connection with various example embodiments, current sources are used to drive transistor-based circuits coupled across a first resistive circuit, to send signals on a communications medium. While driving the transistor-based circuits, the current sources are used to drive reference transistor-based circuits coupled across a second resistive circuit. A differential output signal based upon a power-related value across the first resistive circuit, less a power-related value across the second resistive circuit. This differential output signal characterizes a power-related value corresponding to a received signal on the communications medium, as gleaned from a total signal corresponding to both transmitted and received signals, less a signal corresponding to the transmitted signal.

20 Claims, 2 Drawing Sheets

FULL DUPLEX COMMUNICATION CIRCUIT AND METHOD THEREFOR

Figure 1:
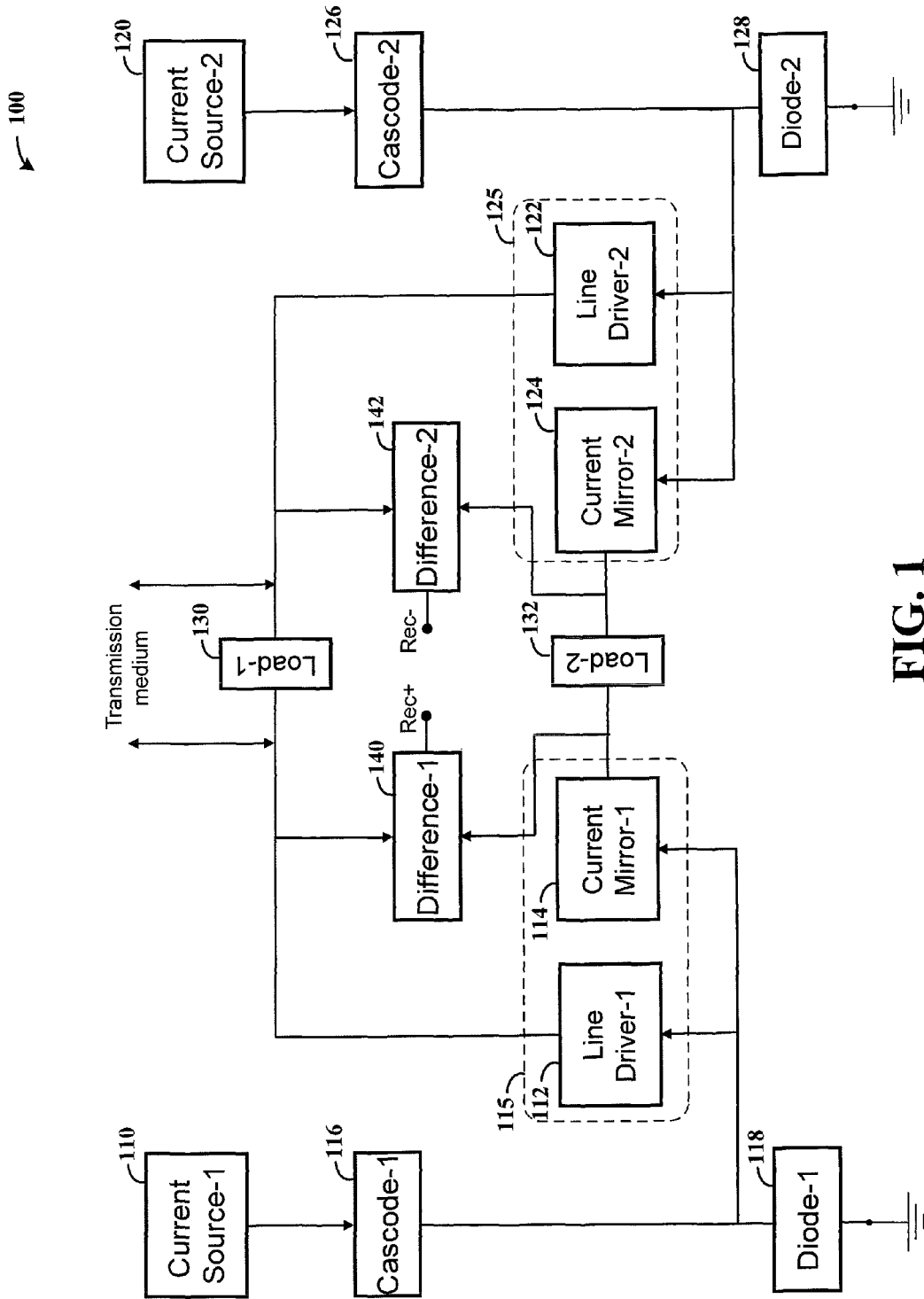

The present invention relates generally to communications, and more specifically, to full duplex communications circuits and methods.

Communication busses use a variety of communications approaches to suite particular applications and available communications circuitry. Many communications approaches involve transceivers that transmit and receive signals simultaneously over a single twisted pair of cables. Accordingly, the signal on a corresponding bus is the summation of the two transmitted signals.

In order to receive a correct transmitted signal, a receiver subtracts its own transmitted signal from the signal that it has received from the bus. This subtracting circuit is often referred to as a hybrid circuit, which can be used in full duplex serial communication over single pair of cables.

While useful in a variety of applications, such signal subtraction approaches can be susceptible to errors and/or otherwise challenging to implement. For example, driving a bus with such signals may require synchronization for noise reduction, which can be difficult to achieve. In addition, many approaches use a plurality of current sources and/or other circuit components, which can increase complexity and cost.

The above matters have presented and continue to present challenges to bus communications, and in particular to the implementation of full duplex communications.

The present invention is exemplified in a number of implementations and applications, some of which are summarized below.

Consistent with an example embodiment of the present invention, a full duplex communications circuit includes first and second current sources, first and second resistive circuits, an interface circuit, first and second transistor-based driver circuits and a differential output circuit. The interface circuit is coupled to the current sources to send and receive signals on a communications medium. The first transistor-based driver circuit is coupled between the first current source and each of the first and second resistive circuits, and the second transistor-based driver circuit is coupled between the second current source and each of the first and second resistive circuits. The differential output circuit generates an output signal corresponding to a signal received via the communications medium at the interface circuit, based upon a power-related value across the first resistive circuit, less a power-related value across the second resistive circuit.

Another example embodiment is directed to a full duplex communications circuit as follows. A coupling circuit (e.g., inductive, capacitive, optical, galvanic or other coupling circuit) couples concurrent signals to and from a communications bus for full duplex communications. First and second current sources supply current for driving sets of first and second reference and line driver circuits, via respective diodes. A line resistive circuit is coupled across the coupling circuit, and a reference resistive circuit is connected to provide a reference (e.g., mirrored) value corresponding to a transmitted value, for use in extracting a received value from the coupling circuit.

The driver circuits include a first transistor-based reference driver circuit coupled between the first current source and the reference resistive circuit, and a first transistor-based line driver circuit coupled between the first current source and the line resistive circuit. The driver circuits further include a second transistor-based reference driver circuit coupled between the second current source and the reference resistive circuit, and a second transistor-based line driver circuit coupled between the second current source and the line resistive circuit. A first differential amplifier has inputs connected to outputs of the first transistor-based line driver circuit and the first transistor-based reference driver circuit, the output of the first differential amplifier corresponding to a high output indicative of the received signal on the communications bus. A second differential amplifier has inputs connected to outputs of the second transistor-based line driver circuit and the second transistor-based reference driver circuit, the output of the second differential amplifier corresponding to a low output indicative of the received signal, and the combined output of the first and second differential amplifiers being indicative of a signal received via the galvanic coupling circuit.

Other example embodiments are directed to methods involving approaches such as those discussed above. One such method for communicating on a duplex communications medium is as follows. Current sources are used to drive transistor-based circuits, coupled across a first resistive circuit, to send signals on a communications medium. While driving the transistor-based circuits, the current sources are used to drive reference transistor-based circuits coupled across a second resistive circuit. A differential output signal is generated, based upon a power-related value across the first resistive circuit, less a power-related value across the second resistive circuit.

The above summary is not intended to describe each embodiment or every implementation of the present disclosure. The figures and detailed description that follow more particularly exemplify various embodiments.

Figure 2:
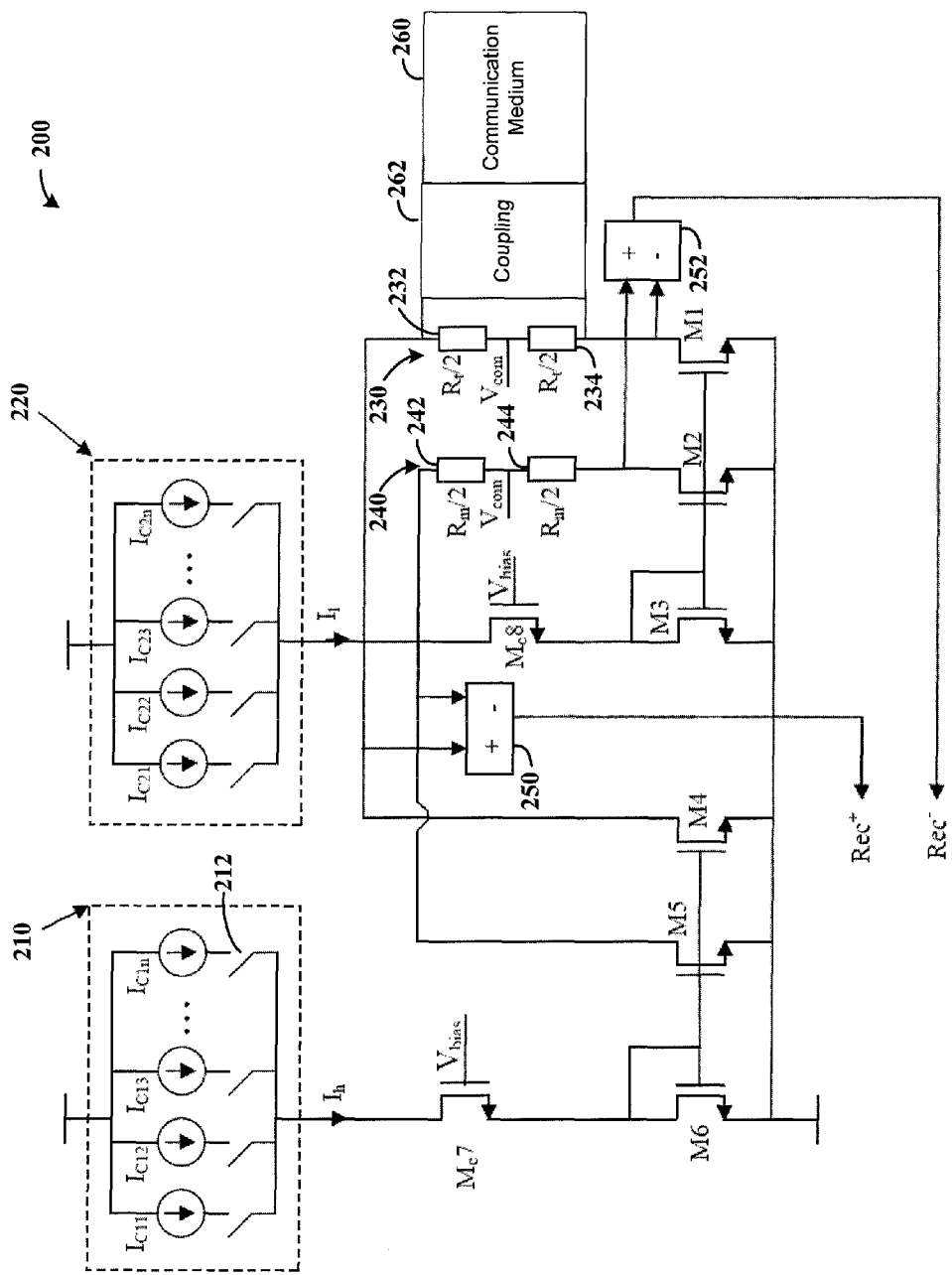

The invention may be more completely understood in consideration of the following detailed description of various embodiments of the invention in connection with the accompanying drawings, in which:

FIG. 1 shows a communications driver circuit, according to an example embodiment of the present invention; and FIG. 2 shows another communications driver circuit, according to another example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention including aspects defined by the claims.

The present invention is believed to be applicable to a variety of different types of processes, devices and arrangements for use with communications busses. While the present invention is not necessarily so limited, various aspects of the invention may be appreciated through a discussion of examples using this context.

According to an example embodiment of the present invention, a reference driver circuit tracks a load driver circuit that is connected across a transmission medium (e.g., a communications bus). Each driver circuit is supplied by a common set of amplifier circuits that supply the driver circuits for generating a transmission signal for transmission on the transmission medium. Differential circuits are respectively coupled across the driver circuits supplied by respective ones of the amplifier circuits, and collectively provide a differential output corresponding to a detected signal level of the transmission medium, less a portion of the signal level corresponding to the signal generated via the driver circuits. Accordingly, a received signal can be extracted/detected from a combined signal including the received and transmission signals on the transmission medium. The reference driver circuit facilitates full duplex communications (e.g., via a twisted pair of cables) are facilitated over the transmission medium, using this approach.

In connection with a more particular example embodiment, a duplex communications circuit includes first and second current sources that are coupled to an interface circuit for sending and receiving signals on a communications medium. The duplex communications circuit includes first and second resistive circuits (e.g., of a known, or common value), the first circuit being coupled across the interface circuit. Transistor-based line driver circuits are respectively coupled between the first current source and the first resistive circuit and between the second current source and the first resistive circuit, with the first resistive circuit being coupled between the line driver circuits. Transistor-based reference driver circuits are respectively coupled between the first current source and the second resistive circuit and between the second current source and the second resistive circuit, with the second resistive circuit being coupled between the reference driver circuits. The current sources and driver circuits generate a signal for communicating on the communications medium, such as by generating a pulsed amplitude modulated signal at different levels.

A differential output circuit generates an output signal corresponding to a signal received via the communications medium at the interface circuit, based upon a power-related value across the first resistive circuit, less a power-related value across the second resistive circuit. This output signal is indicative of a signal received via the communications medium (if any), as corresponding to the respective differentials between the resistive circuits.

The differential output circuit is connected in various manners. In some embodiments, the differential output circuit includes two sense circuits respectively coupled to detect power-related values at circuit nodes corresponding to the first and second current sources. A first one of the sense circuits is connected to each of the resistive circuits on a side of the resistive circuits corresponding to the first current source. A second one of the sense circuits is connected to an opposite side of each of the resistive circuits, corresponding to the second current source. The differential output includes an output from each of the sense circuits, and is correspondingly indicative the respective differentials between the power values at the resistive circuits, for each current source. Accordingly, variations in the current sources and connecting circuitry can be accounted for by using the differential comparison as an indicator of a signal received via the interface circuit.

In connection with another example embodiment, the differential output circuit includes first and second differential amplifiers. The first amplifier has inputs connected to the line driver circuits and reference driver circuits that are coupled to the first current source. The second differential amplifier has inputs connected to the line driver circuits and reference driver circuits that are coupled to the second current source. The outputs of the first and second differential amplifiers respectively correspond to high and low outputs indicative of the received signal, and are used as an indication thereof.

The current sources, driver circuits and other connecting circuits can be implemented under a variety of conditions and using different components. In some embodiments, the current sources and reference driver circuits supply current to the second resistive circuit that tracks the current supplied to the first resistive circuit via the current sources and the line driver circuits under a common load condition. In this context, the differential between a power-related condition corresponding to the supplied current can be used as an indication of a power-related condition on the first resistive circuit, generally independently from mismatches in the circuits.

In some embodiments, the current supply from the sources is filtered via cascode filter circuits that filter noise, such as can occur due to current source switching from an output of the current sources provided to the driver circuits. In some implementations, a cascode filter circuit is connected between the first current source and the driver circuits that are coupled to the first current source. Another cascode filter circuit connected between the second current source and the driver circuits that are coupled to the second current source. In other implementations, cascode filters are implemented with diodes, with each transistor-based circuit separated from its respective current source by a cascode filter and diode.

As consistent with the above, the duplex communication circuit can be operated for communicating using one or more of a variety of standards or protocols. In some implementations, the current sources and driver circuits drive the interface circuit to communicate pulse-amplitude modulated signals on the communications medium. Two, five or more levels are achieved, to suit different applications.

The resistive circuits can be implemented in one or more of a variety of manners, using common resistive values. In some embodiments the first and second resistive circuits respectively include first and second resistors connected in series. For each resistive circuit, a point common mode voltage circuit is connected between the first and second resistors to provide common voltage thereat.

In some embodiments, the transistor-based driver circuits each consist of two transistors. For each current source, one of the transistors is coupled between the current source one of the resistive circuits, and the other transistor is coupled between the current source and the other of the resistive circuits.

Turning now to the figures, FIG. 1 shows a communications driver circuit 100 for sending and receiving signals over a transmission medium, according to another example embodiment of the present invention. The communications driver circuit 100 includes a current source 110 that feeds a line driver 112 and current mirror 114 (e.g., a reference driver circuit) through a cascode filter 116, with diode 118 therebetween. Another current source 120 similarly feeds a line driver 122 and current mirror 124 through a cascode filter 126, with diode 128 therebetween.

Load 130 is connected between line drivers 112 and 122, and across a transmission medium. Another load 132 is connected between the current mirrors 114 and 124 and acts as reference load, and configured to provide a reference value. The current sources, cascode filters, and current mirrors are arranged to supply a current to the load 132 that tracks (e.g., mirrors) the current supplied to load 130, under common conditions.

Difference circuits 140 and 142 are respectively coupled across the outputs of line driver 112 and current mirror 114, and across the outputs of line driver 122 and current mirror 124. As the voltage drop across load 132 is influenced by the current sources, the differential output as presented via the difference circuits changes accordingly, and corresponds to the signals on the transmission medium, less that of the signal transmitted by the circuit 100. Accordingly, the voltage drop across load 130 is influenced by the current sources as well as by the current on the transmission medium. These difference circuits provide outputs respectively characterizing a differential output that is indicative of a different power-related component (e.g., voltage drop) at each of the loads 130 and 132, and generally independent from mismatches in the respective connected circuit components.

In some implementations, the driver circuit 100 is configured to operate as a full duplex serial communication system, using the differential measurement with two or more current sources and corresponding circuits (two shown), to provide an output indicative of a signal on a transmission medium received from another source. The transmission medium is configured for communicating by way of a pulse amplitude modulated signal through a single pair of cables, with the difference circuits 140 and 142 providing a corresponding output indicative of a received signal. Such applications may, for example be used in automotive communications systems.

In various implementations, a multiple-level pulse amplitude modulation communication approach is implemented in connection with a differential duplex communication approach, such as shown in and described above in connection with FIG. 1. For example, a five-level PAM signaling technique in accordance with IEEE standard 802.3ab for gigabit Ethernet can be implemented using, as part of a communications circuit, the driver circuit 100. To set such levels, the current sources 110 and 120 can be configured in strength and related characteristics (e.g., by including two or more current sources with each source 110, 120) for efficiently scaling to support various such PAM signal levels (e.g., five or more). In some implementations, the current sources 110 and 120 are configured with a sufficiently small step size to produce a desired number of levels for PAM signaling.

In connection with other embodiments, the line driver 112 and current mirror 114 are part of a common circuit 115, and line driver 122 and current mirror 124 are also part of a common circuit 125. Each of the respective circuits 115 and 125 is coupled between a current source as an input and, as an output, to both of loads 130 and 132. These circuits 115 and 125 may be implemented respectively with two circuits (e.g., two driver transistors), and/or with other circuits as appropriate.

FIG. 2 shows a communications driver circuit 200 that drives a signal on a bus, and subtracts a transmitted signal from a received signal for full duplex communications, according to another example embodiment. The bus driver circuit 200 includes current source circuits 210 and 220, respectively including one or more current sources are exemplified by current sources $I_{c11}, I_{c12}, \ldots I_{c1n}$, and current sources $I_{c21}, I_{c22}, \ldots I_{c2n}$. The number of current sources is used to suit particular applications, such as those involving pulse amplitude modulation (PAM) communications involving multiple levels, as relative to the driving strength (e.g., 20 mA) for each source. Each of the individual current sources is respectively connected with switches (e.g., switch 212 is labeled by way of example), which can be activated in order to build up a differential voltage across a termination resistor circuit ($R_t$) 230.

Termination resistor circuit 230 includes two (e.g., equal) resistors 232 and 234. A point common mode voltage $V_{com}$ is supplied at a node connecting the resistors 232 and 234 and provides a constant common mode voltage. A mirror resistor circuit ($R_m$) 240 similarly includes two (e.g., equal) resistors 242 and 244. Another point common mode voltage $V_{com}$ is supplied at a node connecting the resistors 242 and 244, and provides a constant common mode voltage.

Transistors M3 and M6 act as diodes, transistors M1 and M4 act as current drivers, and transistors M2 and M5 mirror the current that flows through drivers M1 and M4. Transistors Mc7 and Mc8 act as a cascode filter to filter out undesired frequencies (e.g., due to a switching effect), and to increase the gain and output impedance of the current source circuits 210 and 220. Transistor M6 is coupled between transistor Mc7 and ground, with its gate tied to the gate of transistor M5.

When switch(es) is/are turned on, the circuit 200 is configured to flow current through the driver transistors M1 and M4, and builds up a differential voltage across the termination resistor circuit 230. The same current also flows through mirroring transistors M2 and M5, and generates a finite differential voltage across the mirror resistor circuit 240. The transistors M2, M3, M4, and M5 are matched, and the differential voltages across the termination resistor circuit 230 due to current drivers M1, M4 and the mirror resistor 240 are equal.

Differential amplifiers 250 and 252 operate to provide an output at Rec$^+$ and Rec$^-$ that is indicative of a signal received from a communications medium 260, via a coupling circuit 262. Specifically, amplifier 250 has its positive and negative inputs respectively connected to resistors 232 and 242 of the termination and mirror resistor circuits 230 and 240. Amplifier 252 has its positive and negative inputs respectively connected to resistors 244 and 234 of the mirror and termination resistor circuits 240 and 230. Accordingly, the output at Rec$^+$ and Rec$^-$ provides an output corresponding to a received signal as a value across the termination resistor 230 with a transmitted signal subtracted therefrom.

The coupling circuit 262 may include a coupling circuit that at least partially isolates the communications medium 260 (e.g., and undesirable voltage levels) from the rest of circuit 200, such as an inductive, capacitive or galvanic isolation circuit, or may be directly connected to the communications medium (e.g., direct/galvanic coupling). In accordance with various example embodiments, the driver circuit 200 is configured to withstand expected voltage variations, when directly connected to the communications medium 260 via the coupling circuit 262. For example, the transistors M1 and M4, and differential amplifiers 250 and 252 may be configured to withstand expected voltages, or additional protection circuits may be added.

Based upon the above discussion and illustrations, those skilled in the art will readily recognize that various modifications and changes may be made to the present invention without strictly following the exemplary embodiments and applications illustrated and described herein. For example, a variety of different combinations of amplifier circuits, or amplifier circuits with different capabilities, can be used to implement pulse-based communications. In addition, other types of circuits may be implemented to achieve functionality as discussed herein. Such modifications do not depart from the true spirit and scope of the present invention, including that set forth in the following claims.

What is claimed is:

1. A full duplex communications circuit comprising:
   first and second current sources;
   an interface circuit coupled to the current sources and configured to send and receive signals on a communications medium, the interface circuit including a first resistive circuit;
   a second resistive circuit coupled in parallel with the first resistive circuit;
   a first transistor-based driver circuit coupled between the first current source and each of the first and second resistive circuits;
   a second transistor-based driver circuit coupled between the second current source and each of the first and second resistive circuits; and
   a differential output circuit configured and arranged to generate an output signal corresponding to a signal received via the communications medium at the interface circuit, based upon a power-related value across the first resistive circuit, less a power-related value across the second resistive circuit.

2. The circuit of claim 1, wherein
the first transistor-based driver circuit includes
   a first transistor-based line driver circuit coupled between the first current source and the first resistive circuit, and
   a first transistor-based reference driver circuit coupled between the first current source and the second resistive circuit, and
the second transistor-based driver circuit includes
   a second transistor-based line driver circuit coupled between the second current source and the first resistive circuit, and
   a second transistor-based reference driver circuit coupled between the second current source and the second resistive circuit.

3. The circuit of claim 1, wherein the differential output circuit includes
   a first differential amplifier having inputs connected to outputs of the first transistor-based driver circuit, the output of the first differential amplifier corresponding to a high output indicative of the received signal, and
   a second differential amplifier having inputs connected to outputs of the second transistor-based driver circuit, the outputs of the second transistor-based driver circuit, the output of the second differential amplifier corresponding to a low output indicative of the received signal.

4. The circuit of claim 1, wherein the driver circuits are configured and arranged to supply a current to the second resistive circuit that tracks the current supplied to the first resistive circuit under a common load condition.

5. The circuit of claim 1, wherein
the first and second resistive circuits include resistors configured and arranged to provide a resistor-divider arrangement at the interface circuit, and
the resistors have a common resistance value.

6. The circuit of claim 1, wherein
the first and second resistive circuits include resistors,
the resistors have different resistance values, and
the differential output circuit includes a differential amplifier having a gain set based upon the different resistance values, to provide the output to correspond to the received signal.

7. The circuit of claim 1, further including cascode filter circuits configured and arranged to filter noise due to current source switching from an output of the current sources provided to the driver circuits.

8. The circuit of claim 1 further including
a cascode filter circuit connected between the first current source and the first driver circuit, and
another cascode filter circuit connected between the second current source and the second driver circuit.

9. The circuit of claim 1, wherein the current sources and driver circuits are configured to drive the interface circuit to communicate pulse-amplitude modulated signals on the communications medium.

10. The circuit of claim 1, wherein the interface circuit is configured to send and receive full duplex signals on a single pair of communications lines, and the differential output circuit is configured and arranged to generate the output signal corresponding to a signal received via the single pair of communications lines, less a value of a signal sent on the single pair of communications lines by the duplex communications circuit.

11. The circuit of claim 1,
wherein the first and second resistive circuits respectively include first and second resistors connected in series,
further including a point common mode voltage circuit configured to supply, for each of the first and second resistive circuits, a common voltage at a node that connects the first and second resistors.

12. The circuit of claim 1 further including
a first cascode filter circuit connected between the first current source and the first driver circuit,
a first diode circuit connected between the first cascode filter circuit and the first driver circuit,
a second cascode filter circuit connected between the second current source and the second driver circuit, and
a second diode circuit connected between the second cascode filter circuit and the second driver circuit.

13. The circuit of claim 1, wherein the first and second current sources are configured to drive the driver circuits at different pulse levels to generate a pulse amplitude modulated signal on the communications medium.

14. The circuit of claim 1, wherein
the first transistor-based driver circuit consists of
   a first transistor-based line driver circuit coupled between the first current source and the first resistive circuit, and
   a first transistor-based reference driver circuit coupled between the first current source and the second resistive circuit, and
the second transistor-based driver circuit consists of
   a second transistor-based line driver circuit coupled between the second current source and the first resistive circuit, and
   a second transistor-based reference driver circuit coupled between the second current source and the second resistive circuit.

15. The circuit of claim 1, wherein the interface circuit includes a galvanic circuit configured to galvanically couple signals to and from the communications medium.

16. The circuit of claim 1, wherein the interface circuit directly couples outputs of the first and second transistor based driver to the communications medium.

17. A method for communicating on a duplex communications medium, the method comprising:
driving a transistor-based circuit that is coupled across a first resistive circuit, using a current source, wherein the driving is performed to send electrical signals on a communications medium;
while driving the transistor-based circuit, driving a reference transistor-based circuit that is coupled across a second resistive circuit, the second resistive circuit being coupled in parallel with the first resistive circuit; and
generating a differential output signal based upon a power-related value across the first resistive circuit, less a power-related value across the second resistive circuit.

18. The method of claim 17, wherein generating a differential output signal based upon a power-related value across the first resistive circuit, less a power-related value across the second resistive circuit includes
generating a first output signal based upon a differential power-related value across circuit nodes respectively coupling a first current source with the first resistive circuit and coupling the first current source with the second resistive circuit, and
generating a second output signal based upon a differential power-related value across circuit nodes respectively coupling the second current source with the first resistive circuit and coupling the second current source with the second resistive circuit.

19. The method of claim 17, wherein
using current sources to drive transistor-based circuits includes
   using a first current source to drive a first transistor-based circuit connected between the first current source and the first resistive circuit, and
   using a second current source to drive a second transistor-based circuit connected between the second current source and the first resistive circuit,
using the current sources to drive reference transistor-based circuits includes
   using the first current source to drive a third transistor-based circuit connected between the first current source and the second resistive circuit, and
   using the second current source to drive a fourth transistor-based circuit connected between the second current source and the second resistive circuit.

20. A full duplex communications circuit comprising:
a galvanic coupling circuit configured to galvanically couple concurrent signals to and from a communications bus;
first and second current sources;
a reference resistive circuit;
a line resistive circuit coupled across the galvanic coupling circuit and in parallel with the reference resistive circuit;
a first diode circuit connected between the first current source and ground;
a second diode circuit connected between the second current source and ground;
a first transistor-based reference driver circuit coupled between the first diode circuit and the reference resistive circuit;
a first transistor-based line driver circuit coupled between the first diode circuit and the line resistive circuit;
a second transistor-based reference driver circuit coupled between the second diode circuit and the reference resistive circuit;
a second transistor-based line driver circuit coupled between the second diode circuit and the line resistive circuit;
a first differential amplifier having inputs connected to outputs of the first transistor-based line driver circuit and the first transistor-based reference driver circuit, the output of the first differential amplifier corresponding to a high output indicative of a received signal; and
a second differential amplifier having inputs connected to outputs of the second transistor-based line driver circuit and the second transistor-based reference driver circuit, the output of the second differential amplifier corresponding to a low output indicative of the received signal, a combined output of the first and second differential amplifiers being indicative of a signal received via the galvanic coupling circuit.

* * * * *